(12) United States Patent
Watson et al.

(10) Patent No.: US 12,411,656 B2
(45) Date of Patent: Sep. 9, 2025

(54) INTELLIGENT VOICE RESPONSE SYSTEMS AND METHODS

(71) Applicant: Allstate Insurance Company, Northbrook, IL (US)

(72) Inventors: Michael Steven Watson, Delaware, OH (US); Tai-Yip Kwok, Jersey City, NJ (US); Michael O'Connor, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 151 days.

(21) Appl. No.: 18/491,238

(22) Filed: Oct. 20, 2023

(65) Prior Publication Data

US 2024/0134598 A1 Apr. 25, 2024
US 2024/0231753 A9 Jul. 11, 2024

Related U.S. Application Data

(60) Provisional application No. 63/418,117, filed on Oct. 21, 2022.

(51) Int. Cl.
| | |
|---|---|
| G08B 21/00 | (2006.01) |
| B60Q 9/00 | (2006.01) |
| G06F 3/16 | (2006.01) |
| G06N 3/006 | (2023.01) |

(52) U.S. Cl.
CPC ............... *G06F 3/167* (2013.01); *B60Q 9/00* (2013.01); *G06N 3/006* (2013.01)

(58) Field of Classification Search
USPC ...... 340/425.5, 428, 426.19, 426.22, 426.34, 340/433–436, 441, 466, 516, 692, 522, 340/527, 602, 539.19, 539.27, 539.24, 340/539, 28, 5.84
See application file for complete search history.

(56) References Cited

U.S. PATENT DOCUMENTS

| | | | |
|---|---|---|---|
| 6,292,828 B1 * | 9/2001 | Williams | G06F 11/328 709/224 |
| 2004/0068364 A1 * | 4/2004 | Zhao | G08G 1/096775 455/414.2 |
| 2006/0276201 A1 * | 12/2006 | Dupray | H04W 4/029 455/456.1 |
| 2007/0179792 A1 * | 8/2007 | Kramer | G06Q 30/02 705/1.1 |

(Continued)

*Primary Examiner* — Daniel Previl
(74) *Attorney, Agent, or Firm* — Dinsmore & Shohl LLP

(57) ABSTRACT

Intelligent voice response systems and methods may include one or more machine readable instructions stored in a memory that cause a processor to receive an automated input including at least two of the following: a vehicle metric of the vehicle, a driving score of a user of the vehicle, a driving time during a trip of the vehicle, a geographical location of the vehicle, an adverse weather event within a predetermined distance of the vehicle, a historical driving route of the vehicle, a predicted driving route of the vehicle within a first predetermined period of time, or a sound within a predetermined distance of the vehicle. An action may be generated and implemented and reception of an affirmative response from the user may be determined. An alert may be generated to the user based on the affirmative response.

20 Claims, 3 Drawing Sheets

(56) References Cited

U.S. PATENT DOCUMENTS

| | | | |
|---|---|---|---|
| 2009/0286514 A1* | 11/2009 | Lichorowic | H04M 3/4938 |
| | | | 455/412.2 |
| 2013/0077772 A1* | 3/2013 | Lichorowic | G06Q 40/08 |
| | | | 379/88.01 |
| 2020/0293587 A1* | 9/2020 | Ayers | G06F 16/90335 |
| 2020/0374394 A1* | 11/2020 | Karp | G06F 9/54 |
| 2022/0289250 A1* | 9/2022 | Oba | G08G 1/16 |

* cited by examiner

INTELLIGENT VOICE RESPONSE SYSTEMS AND METHODS

TECHNICAL FIELD

The present disclosure relates to intelligent voice response systems and methods and, in particular, intelligent voice systems and methods including an interactive voice response system integrated into a vehicle.

BACKGROUND

A vehicle may have a voice response system for a user to perform functions of a vehicle processing unit. For example, the voice response systems may notify the user of text messages or make phone calls. A need exists for an intelligent voice response system that integrates safety and/or advertising features.

BRIEF SUMMARY

Aspects of the present disclosure relate to voice response systems. In particular, aspects of the disclosure relate to voice response systems integrated into a vehicle.

According to subject matter of the present disclosure, a vehicle notification system may include at least one processor communicatively coupled to a network, an interactive voice response system within a vehicle, a memory communicatively coupled to the at least one processor and the interactive voice response system, and one or more machine readable instructions stored in the memory that cause the vehicle notification system to perform at least the following when executed by the at least one processor: receive an automated input including at least two of the following: a vehicle metric of the vehicle, a driving score of a user of the vehicle, a driving time during a trip of the vehicle, a geographical location of the vehicle, an adverse weather event within a predetermined distance of the vehicle, a historical driving route of the vehicle, a predicted driving route of the vehicle within a first predetermined period of time, or a sound within a predetermined distance of the vehicle, generate, via an artificial intelligence component communicatively coupled to the interactive voice response system within the vehicle and based on the received automated input, an action, implement the action, via the interactive voice response system within the vehicle, to at least one of aid or interact with the user within the vehicle, determine reception of an affirmative response within a second predetermined period of time to the action as implemented, and generate an alert to the user by the interactive voice response system based on the affirmative response.

Although the concepts of the present disclosure are described herein with primary reference to a voice response system for integration into insurance businesses for advertising and safety purposes, it is contemplated that the concepts will enjoy applicability to any setting for purposes of vehicle notification systems, such as any business where advertising and safety are of relevance.

BRIEF DESCRIPTION OF THE DRAWINGS

The present disclosure is illustrated by way of example and not limited in the accompanying figures in which like reference numerals indicate similar elements and in which.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

DETAILED DESCRIPTION

Figure 2:
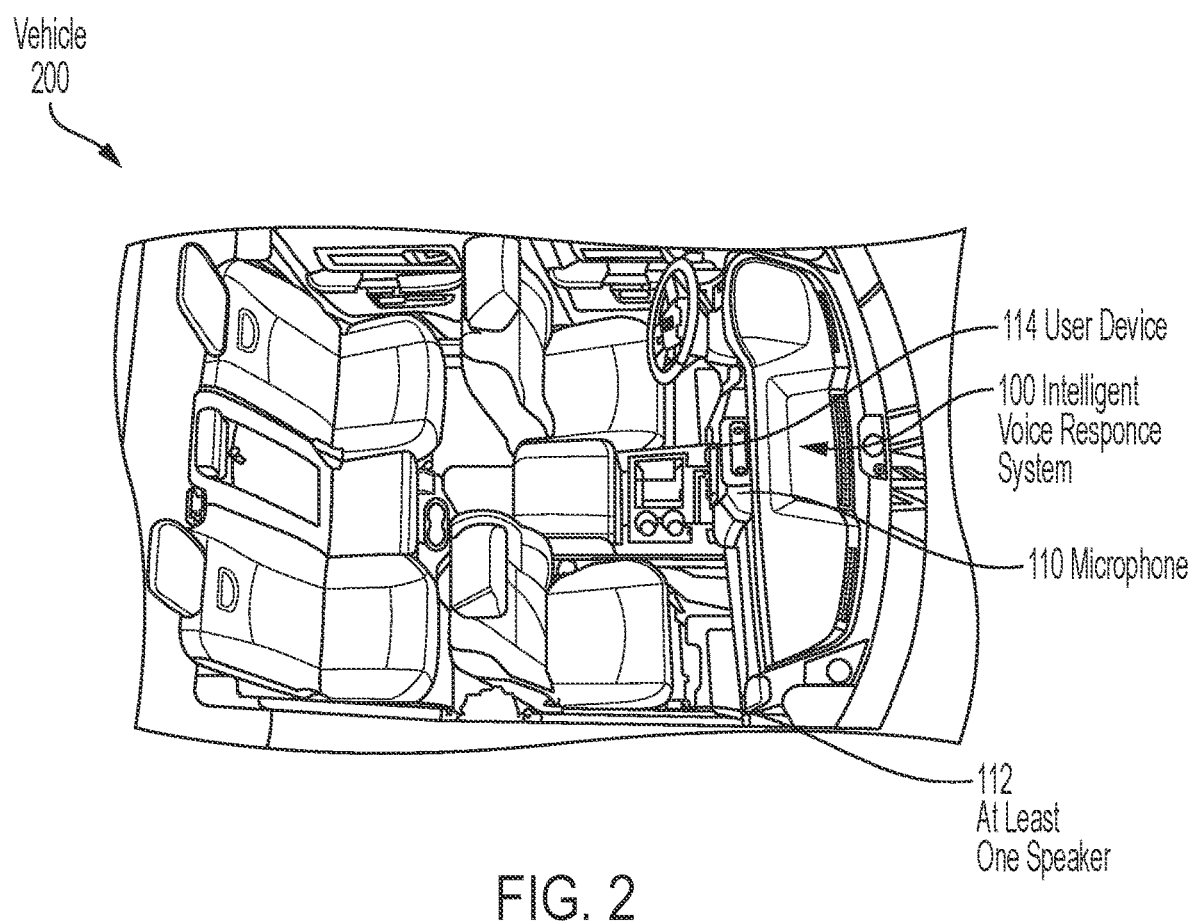
FIG. 2 illustrates a vehicle interior in which an intelligent voice response system may be integrated, according to one or more embodiments shown and described herein.

In embodiments described herein, an intelligent voice response system 100 (e.g., a vehicle notification system 100) is integrated into a vehicle 200 (FIG. 2) configured to provide a user recommendations based on data sensed by a plurality of components. The vehicle 200 may be an automotive vehicle such as a car, truck recreational vehicle, or other similar automotive transport. The intelligent voice response system 100 may utilize one or more artificial neural network (ANN) models as understood to those skilled in the art or as yet-to-be-developed to generate communications and alerts as described in embodiments herein. Such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from audio, images, clustering algorithms, or combinations thereof.

As an example and not a limitation, a machine learning module of the ANN may include artificial intelligence components selected from the group consisting of an artificial intelligence engine, Bayesian inference engine, and a decision-making engine, and may have an adaptive learning engine further comprising a deep neural network learning engine. Data stored and manipulated in the intelligent voice response system 100 as described herein is utilized by the machine learning module, which in embodiments able to leverage a cloud computing-based network configuration such as the cloud to apply machine learning and artificial intelligence or may be able to rely on an internal architecture to apply machine learning and artificial intelligence as described herein. This machine learning application may create models that can be applied by the intelligent machine learning to make it more efficient and intelligent in execution.

Figure 1:
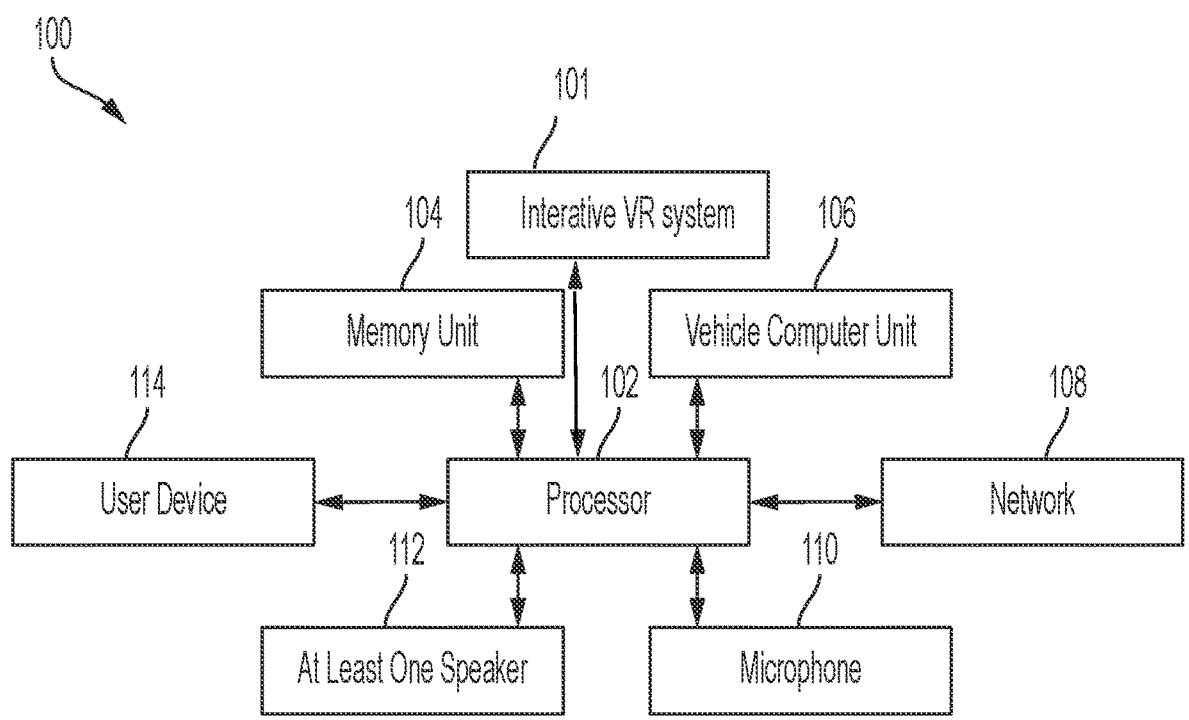
FIG. 1 illustrates a computing environment using a processor communicatively coupled to a plurality of components, according to one or more embodiments shown and described herein.

Referring to FIG. 1, the intelligent voice response system 100 may include a processor 102 communicatively coupled to the plurality of components, such as an interactive voice response system 101, as described further below. The processor 102 may be a controller, an integrated circuit, a microchip, or any other computing device. The processor 102 may be within and/or communicatively coupled to a computing device such as a user device 114, such as a smartphone, and/or a software application downloaded within a user device 114.

The processor 102 may be communicatively coupled to a memory unit 104. In embodiments, the memory unit 104 stores a driving history of the vehicle 200. The driving history of the vehicle 200 may include a plurality of driving metrics such as driving time, time of departure, time of arrival, geographical information, or any other suitable driving metric. Additional driving metrics may be directed to driver behavior, such as a number of times a user applied brakes, how hard they braked (such as measured in G force, change in acceleration, change in velocity, shock, jerk/jolt, and/or estimations and/or combinations of these measures), or the like as measured via one or more vehicle sensors of the vehicle 200.

The processor 102 may also be communicatively coupled to a vehicle computer unit 106 of the vehicle 200. The vehicle computer unit 106 may be configured to sense a plurality of current vehicle metrics such as speed, fuel level, tire pressure, or any other current vehicle metrics. The vehicle computer unit 106 may be configured to sense and/or calculate a plurality of estimated metrics such as a calculation of real-time miles per gallon based on speed and an estimated friction coefficient between tires of the vehicle 200 and a road on which it travels.

The processor 102 may also be communicatively coupled to a network 108. The network 108 may communicate to the processor 102 a plurality of driving conditions. The plurality of driving conditions may include traffic conditions, weather conditions, public event information (such as marathons or sporting events), toll information, a likelihood of drunk drivers, or any other relevant driving condition. The network 108 may comprise any type of known communication medium or collection of communication media and may use suitable, known or yet-to-be developed, protocols to transport information between two endpoints.

The processor 102 may also be communicatively coupled to a microphone 110. The microphone 110 may be configured to sense sound and, more specifically, voice commands from the user or an occupant of the vehicle 200. The microphone 110 may include a single microphone or a plurality of microphones arranged within the vehicle 200. The plurality of microphones may include microphones arranged on one or more after-market devices that are added to the vehicle 200, mobile devices within and/or proximal to the vehicle 200, and/or computing devices associated with the vehicle 200 and/or a user of the vehicle 200. As non-limiting examples, such computing devices may include a smartphone, a smart dashboard, an infotainment system, an appliance, a smart watch and/or other wearable, or other suitable computing devices. The microphone 110 may be configured to sense sound from a car crash using artificial intelligence such that the sound from car crash, when combined with G force (or another measure of hard braking) can improve accuracy of crash detection, may result in the intelligent voice response system 100 implementing an action. The action may be an automatic trigger of an emergency call to an emergency responder, such as a 911 call in the United States, a diagnosis of a potential car repair, or other suitable based on an analysis of the sound.

The processor 102 may also be communicatively coupled to at least one speaker 112. The at least one speaker 112 may be part of a user device 114 such a mobile smart device, the vehicle 200, or a computing device within the vehicle 200, each of which is configured to project sound within the vehicle 200. The intelligent voice response system 100 may communicate commands or alerts to the user through the at least one speaker 112. For example, the processor 102 may direct the at least one speaker 112 to alert the user that the vehicle 200 is running low on fuel.

The processor 102 may also be communicatively coupled to a user device 114. The user device 114 may be capable of making and receiving calls. The user device 114 may be a cellular telephone, tablet, laptop computer, or any other computing device capable of making being connected to a network, such as a cellular, cloud, wide area network (WAN), local area network LAN), satellite, near field communication (NFC), Bluetooth, or other similar network. The user device 114 may include a graphical user interface (GUI) configured to receive user input and selections and generate outputs to the user for display. Inputs may be received through alternative input output/output (I/O) mechanisms, such as tactile I/O, motion sensor I/O, cameras, movements/gestures, keyboards, touchscreens, and the like. These alternatives could be inserted within the user device 114 or within other components such as computing devices of the intelligent voice response system 200.

Insurance Agent Call Recommendation based on Predicted Drive Time: The processor 102 may be configured to predict future driving events based on the driving history of the vehicle 200 recognized by the memory unit 104, the plurality of current vehicle metrics recognized by the vehicle computer unit 106, and the plurality of driving conditions recognized by the network 108. Future driving events may include a predicted route, predicted drive time, or any other future driving event.

The processor 102 may also be configured to direct the at least one speaker 112 to ask the user if the user is interested in a product or service based on the future driving events exceeding a time threshold. For example, when the predicted driving event is one in which the drive time will be over 30 minutes, the processor 102 may direct the at least one speaker 112 to ask if the user is interested in calling an insurance agent to save on car insurance. The processor 102 may then direct the user device 114 to call an insurance agent based on a positive response of the user sensed through the microphone 110 and/or other input device.

Insurance quotes based on driving behavior: In embodiments, a trip monitoring application is stored in the memory unit 104 and is communicatively coupled to the processor 102. The trip monitoring application may store a history of current vehicle metrics, such as speed compared to the speed limit and a magnitude of braking. The trip monitoring application may determine a level of safe driving based on the history of current vehicle metrics (i.e., going the speed limit and braking softly as a safe driving behavior versus speeding and braking hard as a more risky driving behavior). Scores may be associated with the level of safe driving determined. The trip monitoring application is configured to then direct the at least one speaker 112 to offer the user an insurance quote based on the level of safe driving and/or score. The higher the level of safe driving, score, or combinations thereof, the lower the insurance quote offered. The processor 102 may then direct the user device 114 to call an insurance agent based on the positive response of the user sensed through the microphone 110. Voice assistance via the intelligent voice response system 100 may also be configured to deliver quotes directly to the user without the user calling an agent.

Home Insurance Recommendations: In embodiments, the user device 114 may include a user home-buying application communicatively coupled to the processor 102. The user home-buying application may include a home-buying schedule of future home tours or open house events that the user is interested in attending. Based on the home-buying schedule, the processor 102 may direct the at least one speaker 112 to ask if the user is interested in purchasing home insurance.

If the processor 102 determines that the user is interested in purchasing home insurance for a home, such as through input received via the microphone 110 from the user and processed through, for example, natural language processing, the intelligent voice response system 100 via the at least one speaker 112 may provide predicted insurance quotes based on a neighborhood, square footage, and geographical location associated with the home. The predicted insurance quotes may be a range of quotes. The processor 102 may also direct the user device 114 to call an insurance agent based on the positive response of the user sensed through the microphone 110 and/or GUI.

Alerts to evacuate based on adverse weather events: In embodiments, the network 108 may be communicatively coupled to an alert network and be configured to provide information to the processor 102 regarding one or more alerts associated with weather in surrounding areas of the vehicle 200. For example, the alert network may issue a weather alert when an adverse weather event is expected in a geographical area. The processor 102 may then communicate the weather alert to the user through the at least one speaker 112. The at least one speaker 112 may communicate that there is a certain chance of the adverse weather event occurring; the at least one speaker 112 may also recommend evacuating the area based on the weather alert. The adverse weather event may include a flood, hurricane, tornado, wildfire, hail, or any other adverse weather event.

Rerouting based on adverse weather event: The processor 102 may also direct the at least one speaker 112 to communicate that the user should reroute based on an adverse weather event being present on a route the user is taking or plans to take via the vehicle 200. For example, the processor 102 may determine that the user plans to drive through a flood zone based on the driving history of the vehicle 200 and the adverse weather event. The at least one speaker 112 may then communicate to the user that the user is about to drive through a flood zone. The at least one speaker 112 may suggest alternative routes that avoid the flood zone. The at least one speaker 112 may also suggest a wait time for the adverse weather event to end. A driving score of the user may be increased based on a selected option of avoiding a flood zone, waiting for the wait time, or combinations thereof as indicators of safe driving practices and choices. A corresponding reduction in an insurance premium and/or deductibles may result based on the increase of the driving score based on the chosen and implemented safe driving practices.

Encouraging evacuation through lessened deductibles: The processor 102 may also direct the at least one speaker 112 to communicate to the user that the user is eligible for reduced deductibles and/or premiums (such as rates) if the user takes precautions against an upcoming adverse weather event. If the network 108 determines that the upcoming adverse weather event is likely to impact a user's geographical location, the processor 102 may direct the at least one speaker 112 to communicate to the user that it is suggested the user take precautions. Precautions may include evacuating, moving the vehicle 200 into a garage, boarding up windows in a user's home, installing a sump pump in the user's home, or any other precautions to protect against property damage. Property may include the vehicle, the user's home, or other property associated with the user.

The processor 102 may also direct the at least one speaker 112 to communicate to the user that if the user takes the precautions, the user will be eligible for reduced deductibles, lower rates, and/or other incentives on insurance associated with the property. For example, the processor 102 may direct the user through the at least one speaker 112 that the user is eligible for a decreased deductible, rate, and/or other incentive on insurance next month if the user moves the vehicle 200 into the garage before an expected hail storm. If the user moves the vehicle 200 into the garage before the hail storm, the user will receive a discounted rate and/or deductible on insurance coverage for the vehicle 200 the next month.

If the user indicates that the user intends to take the suggested precautions through the microphone 110, then the at least one speaker 112 may suggest a store to get supplies from to implement the suggested precautions. Alternatively, if the suggested precaution is evacuation, the at least one speaker 112 may suggest a route for evacuation. The at least one speaker 112 may also suggest an optimum time of day to depart in order to avoid heavy traffic.

Encouraging evacuation through advancement of money: In alternative embodiments, the intelligent voice response system 100 may also inform the user that the user is eligible for a money advancement if the user decides to evacuate based on an adverse weather event. The processor 102 may communicate to the user through the at least one speaker 112 that the user is eligible for the money advancement if the user evacuates. The money advancement acts to encourage the user to evacuate and to assist the user in evacuation costs. In embodiments, the user may receive half of the money advancement before evacuation, and half of the money advancement upon a completed evacuation. Alternatively, the user may receive an amount of money only upon the completed evacuation.

The user may receive the money advancement through a money receiving application communicatively coupled to the user device 114. The money receiving application may be any application capable of storing a user's bank account information and receiving money transfers from third parties. The money receiving application may directly transfer the money advancement to the user's bank account, or the money advancement could remain in the money receiving application until the user elects to transfer it to the user's bank account. The user may also receive the money advancement through a hard copy check, cryptocurrency, mobile payment and/or money transfer application, or another suitable payment option.

In embodiments, the user may receive a line of credit for evacuating. The at least one speaker 112 may communicate to the user that the user is eligible for a line of credit and that the user's line of credit will be implemented upon the completed evacuation.

In embodiments, the user may also receive a voice message through the at least one speaker 112 that the user is eligible for home insurance coverage for a home for a certain premium or range of premiums based on the adverse weather event and/or a history of weather events in a geographical area surrounding the home. The user may receive this message when being notified about the upcoming adverse weather event.

Providing warnings based on upcoming driving routes: In embodiments, the intelligent voice response system 100 may include a driver warning system communicatively coupled to the processor 102. The driver warning system may be configured to alert the user of an upcoming driving hazard through the at least one speaker 112.

The driver warning system may also be communicatively coupled to an insurance claim directory. The insurance claim directory may include a risk map database of geographical locations where vehicle insurance claims were filed. Using the insurance claim directory, the driver warning system may determine that an upcoming driving hazard exists in a particular geographical location. The upcoming driving hazard may include a sharp turn, blind turn, dangerous intersection, high-crime area, or any other upcoming driving hazard. The driver warning system may also encourage safe driving by informing the user via the intelligent voice response system 100 that the user performed well based on a user driving reaction as tracked by one or more sensors of the vehicle 100 in light of the upcoming driving hazard. For example, the driver warning system may notify the user through the at least one speaker 112 that the user handled a sharp turn well such as through a reduction in speed.

Integration of unique voice: The driver warning system may also integrate unique voices to communicate to the user through the at least one speaker 112. The user could choose a unique voice that has a certain accent, pitch, or speed. The user may also choose a voice of a celebrity or other specific person. The voice of the celebrity may be a prerecorded message from the celebrity, or a machine-generated voice that acts to mimic the voice of the celebrity. Alternatively, the unique voice may be prerecorded by the user. For example, a parent may prerecord their own voice to warn their child when the child is the driver of the vehicle 200 of upcoming dangerous intersections through the at least one speaker 112.

Routes based on accepted levels of cost compared to time-saving benefits: Embodiments may also include a cost per time savings system communicatively coupled to the processor 102. The cost per time savings system may be configured to calculate a cost-time amount based on the time saved by alternative routes that avoid traffic and a cost that the alternative routes would cost. The user may input a cost-time threshold for the amount the user is willing to pay based on a certain time saving, and the cost per time savings system may only notify the user of alternative routes through the at least one speaker 112 if the cost-time threshold has been exceeded by the cost-time amount. For example, the user may be willing to pay 10 dollars for every 30 minutes saved through alternative routes; the user sets this cost-time threshold in the cost per time savings system. The cost per time savings system will then only notify the user through the at least one speaker 112 of alternative routes that avoid traffic if it saves over 30 minutes for every 10 dollars spent, scaled accordingly.

Unlocking discounts through listening to a sponsored station: In alternative embodiments, the processor 102 may be communicatively coupled to a media streaming service. The media streaming service may be configured to broadcast media content to users. The media content may include music, podcasts, news, videos, or any other media content. The media streaming service may also include premium features. Premium features may include access to advertisement free streaming or access to exclusive media.

The premium features may be locked for users of the media streaming service. However, the premium features may be unlocked through streaming a sponsored playlist. The sponsored playlist may be configured to play directed, personalized, interactive, and/or otherwise customized advertisements to users of the media streaming service. For example, the directed advertisement may be asking a user who is driving if they are interested in saving money on car insurance. The processor 102 may determine the user's geographical location through the network 108. Thus, alternatively, the directed advertisement may ask users of the media streaming service listening in a home if the user is interested in saving money on home insurance. The at least one speaker 112 is configured to communicate this message to the user; the processor 102 may then direct the user device 114 to call, or otherwise contact, an insurance agent based on the positive response of the user sensed through the microphone 110.

Driving monitoring: The intelligent voice response system 100 may further include a driving monitoring system communicatively coupled to the processor 102. The driving monitoring system may monitor the plurality of current vehicle metrics recognized by the vehicle computer unit 106 of the vehicle 200 as sensed by one or more sensors of the vehicle 200, such as vehicle speed, fuel level, acceleration, or another vehicle operational feature.

The driving monitoring system may include a plurality of vehicle metric thresholds. The plurality of vehicle metric thresholds may include a maximum speed limit, a minimum level of fuel level, or a maximum level of acceleration. If one of the plurality of vehicle metric thresholds is exceeded, the driving monitoring system may be configured to notify a monitoring device communicatively coupled to the processor 102. The driving monitoring system may also notify the monitoring device if the user is distracted while driving as sensed by the one or more sensors of the vehicle 200. The monitoring device may be any user device 114 capable of receiving such notifications. Moreover, the plurality of vehicle metrics may be dynamic based on the user's geographical location. For example, the maximum speed limit may change based on what the speed limit is in the user's geographical location.

The driving monitoring system may also be configured to generate and transmit a driving summary. The driving summary may include a summary of vehicle metrics recorded during a driving trip. The driving summary may be read to the user through the at least one speaker 112. Additionally or alternatively, the driving summary may be sent to the monitoring device or the user device 114 for display on the GUI. The driving summaries of different driving trips may be compared with one another.

Maintenance notification and auto ignition lockout: In embodiments, the intelligent voice response system 100 may include a vehicle alert system communicatively coupled to the processor 102. The vehicle alert system may be configured to send an alert notification to the user through the at least one speaker 112 when vehicle maintenance for the vehicle 200 is required. The vehicle alert system may recognize that vehicle maintenance is required through the current vehicle metrics as monitored through one or more vehicle sensors of the vehicle 200 or history of vehicle metrics for the vehicle 200 stored in the memory unit 104. Vehicle maintenance may include refueling, replacing oil, replacing tires, or any other maintenance for a vehicle.

The alert notification may also be for proactive maintenance based on a weather condition, a time of year, or other conditions prompting proactive maintenance. For example, the alert notification may notify to the user through the at least one speaker 112 that it is recommended the user switch to snow tires based on the weather condition or the time of year. The alert notification via the intelligent voice response system 100 of the vehicle 200 may also ask the user (e.g., the driver) if the user would like to buy winter tires and schedule an appointment to have the winter tires installed. The vehicle alert system may be configured to purchase the winter tires and schedule the appointment to have the winter tires installed if the user gives the positive response, such as sensed through the microphone 110 or via the GUI. The alert notification may also include an advertisement that the user have tires installed at a particular store or discounts if the user buys at or within a certain time. Acceptance of the alert notification and/or actions taken and/or scheduled in response to the alert notification may result in a discount, offer, or other insurance pricing incentive being presented to or applied on behalf of the user, e.g., purchase of winter tire install in response to a prompt from the intelligent voice response system 100 may trigger a discounted insurance premium for a number of upcoming months (for example, November through February).

The vehicle alert system may also be configured to notify the user via the intelligent voice response system 100 that a break from driving is recommended when a driving time threshold has been exceeded. For example, if the user has been driving for five hours, the vehicle alert system may notify the user through the at least one speaker 112 that a break from driving is recommended. The vehicle alert system may then inform the user of nearby hotels, gas stations, rest stops, or coffee shops.

The intelligent voice response system 100 may also include an ignition lock-out system communicatively coupled to the processor 102 to prevent a user from driving fatigued. The ignition lock-out system may be configured to lock an ignition of the vehicle 200 when a driving time threshold has been exceeded. For example, the driving time threshold could be eight hours per day; if the user has been driving for nine hours and stops for fuel, the ignition lock-out system may prevent the user from starting the car for at least a pre-determined period of time. In embodiments, the ignition lock-out system may unlock the ignition when sensing another driver is in the driver's seat rather than a previous driver who has been sensed, via one or more sensors of the vehicle 100 that could include a camera and a facial recognition system, as having previously driven the exceeded amount of time.

Integration with home-control unit: In embodiments, the intelligent voice response system 100 may also include a home-control unit communicatively coupled to the processor 102. The home-control unit may be configured to alert the user of home events occurring when the user is away from a home of the user through the at least one speaker 112 of the vehicle 200. Home events may include water leaks, gas leaks, a broken window, an open door, a package delivery, a heater pilot light off, or any other suitable home event that the user may have interest in while away from home. The home-control unit may also notify the user that a door is unlocked or a garage door has been left open. The home-control unit may be communicatively coupled to a smart home application on the user's device.

Moreover, the home-control unit may allow the user to control home systems by voice commands through the microphone 110 of the vehicle 200. For example, if the home-control unit notifies the user that the heater pilot light is off, the home-control unit may also ask if the user would like to shut off gas to the heater through the at least one speaker 112. If the user gives a positive response sensed through the microphone 110, the home-control unit may shut off gas to the heater.

The home-control unit may also recognize that the user is going on a trip. Upon recognizing that the user is going on a trip, the home-control unit may ask the user if the user would like the home-control unit to enter into a home alone mode. The home alone mode is configured to automatically turn certain home systems on and off depending on, for example, a time of day. The home-control unit may recognize that the user is going on a trip because the user has parked the vehicle 200 at an airport. The home-control unit may then ask the user if the user would like to enter a home alone mode. If the user gives the positive response sensed through the microphone 110, the home-control unit will enter into a home alone mode. The home alone mode may turn lights on and off throughout a day, giving the appearance of someone being at the home and, thus, deterring home invasion.

The home-control unit may also recognize that the user is going to the user home through the processor 102. When the home-control unit recognizes that the user is going to the user home, the home-control unit may ask the user through the at least one speaker 112 if the user would like the home-control unit to begin heating up or cooling down the user home. If the user gives a positive response sensed through the microphone 110, the home-control unit will begin to heat up or cool down the user home.

Intelligent road-side assistance unit: Alternative embodiments may further include an intelligent road-side assistance unit communicatively coupled to the processor 102. The intelligent road-side assistance unit may be configured to notify a third-party that the vehicle needs roadside assistance. Moreover, the intelligent road-side assistance unit may notify the third-party of what type of roadside assistance the vehicle 200 is in need. For example, the intelligent road-side assistance unit may notify the third-party that the vehicle 200 is in need of a new radiator hose, a new alternator, a new tire, or any other vehicle component that is in need of replacement. The intelligent road-side assistance unit could notify the user of the type of roadside assistance the vehicle 200 is in need of through the at least one speaker 112 of the vehicle 200 and ask if the user would like to call help. If the user gives the positive response sensed through the microphone 110 of the vehicle 200, the intelligent road-side assistance unit will call the third-party and inform the third-party of what type of roadside assistance the vehicle 200 is in need of to dispatch the appropriate roadside assistance to the vehicle 200. The at least one speaker 112 may then notify the user that roadside assistance has been dispatched along with an estimated time of arrival, contact information, and other types of communication and/or tracking information.

The intelligent road-side assistance unit may also recognize that an emergency situation exists and automatically notify the third-party without sensing a positive response through the microphone 110. For example, if the intelligent road-side assistance recognizes that the vehicle 200 has been in an accident and the user is unresponsive, the intelligent road-side assistance unit may automatically notify the third-party, such as emergency services, that the vehicle 200 was in an accident, the location of the accident, that the user is unresponsive, and that assistance is to be dispatched immediately.

The intelligent road-side assistance unit may also send notifications to the third-party in off-grid situations. Off-grid situations include those where there is no network 108 for the intelligent road-side assistance unit to connect to; instead, the intelligent road-side assistance unit may utilize a satellite to notify the third-party of the emergency situation. The intelligent road-side assistance unit may also give the user routes to a nearby hospital based on whether the user is connected to the network 108.

The intelligent road-side assistance unit may also be communicatively coupled to a drone delivery service. In embodiments, the drone delivery service may deliver a vehicle part to the user, eliminating the need for a third-party to drive to the user.

Dangerous driver notification system: The intelligent voice response system 100 may also include a dangerous driver notification system communicatively coupled to the processor 102. The dangerous driver notification system is configured to allow the user to send a dangerous driver notification to police authorities. The user may send the dangerous driver notification to authorities by stating that there is a dangerous driver to the microphone 110; the user may also send the dangerous driver notification through the user interface (GUI) of the user device 114. The police authorities then get the dangerous driver notification, which is tagged with the user's geographical location.

Short-term insurance quotes: The intelligent voice response system 100 may also provide short-term insurance quotes. The short-term insurance quotes may offer a user insurance on a vehicle 200 based on the time the user is driving the vehicle 200 or the mileage that the user plans to drive the vehicle 200. For example, if the user was borrowing a friend's vehicle for a trip and requests insurance for the trip, the user may receive the short-term insurance quote for this trip based on how far the user plans to travel. The short-term insurance quote may be based on a plurality of insurance conditions, including the driving time, traveling distance, weather conditions, traffic conditions, or any other condition relevant to providing the short-term insurance quote. The short-term insurance quote could also be based on a type of vehicle the user is driving.

Providing proof of insurance: The processor 102 may also be communicatively coupled to a proof of insurance system. The proof of insurance system is configured to provide a proof of insurance on a vehicle dashboard interface or through the at least one speaker 112. The proof of insurance system may recognize the user requires proof of insurance by the user asking for proof of insurance through the microphone 110. When the user asks for proof of insurance, the proof of insurance system may display user insurance information on a head unit (e.g., vehicle dashboard interface) of the vehicle 200, on the GUI of the user device 114, and/or on another display device associated with the vehicle 200. In embodiments, the proof of insurance system may communicate the insurance information through the at least one speaker 112 of the intelligent voice response system 100. Alternatively or additionally, insurance information may be communicated wireless to proximal communications devices, e.g., in response to a user prompt the proof of insurance system may transmit proof of insurance to a nearby NFC-enabled device or other wirelessly/remotely discoverable device, such as a law enforcement communications and/or computing device thereby providing law enforcement access to proof of insurance, perhaps while reducing person-to-person interaction.

Driver recording system: A driver recording system may also be communicatively coupled to the processor 102. The driver recording system may be configured to record audio and video of the user through one or more vehicle sensors of the vehicle 200. The user may direct the driver recording system to record through the microphone 110. The driver recording system may then record audio through the microphone 110, and/or record video through a plurality of cameras. The plurality of cameras may be configured to capture video inside or outside of the vehicle 200; the plurality of cameras may include a driver's side window camera configured to record police interaction with the user if the user has been pulled over.

Instruction system: In alternative embodiments, an instruction system may be communicatively coupled to the processor 102. The instruction system may be configured to give the user recommended instructions based on a situation that the user is in, such as being pulled over or being in a crash. For example, the user may notify the instruction system that the user has been pulled over through the microphone 110. The instruction system may then inform the user of police interaction instructions. The police interaction instructions may include finding a safe place to pull over, keeping the user's hands on the wheel, and/or remaining calm.

The instruction system may also automatically recognize that the user has been in a crash through the plurality of vehicle metrics sensed by the vehicle computer unit 106 and one or more vehicle sensors of the vehicle 200. The instruction system may then give the user vehicle crash instructions. The vehicle crash instructions may include calling the police, documenting vehicle damage through photos, submitting an insurance claim, or any other relevant instructions.

In the embodiments herein, pricing reductions, discounted rates, lowered deductibles, and/or other price variability based on a user action taken in response to voice and/or other prompts/alerts via the intelligent voice response system 100 are contemplated to be within the scope of this disclosure.

Figure 3:
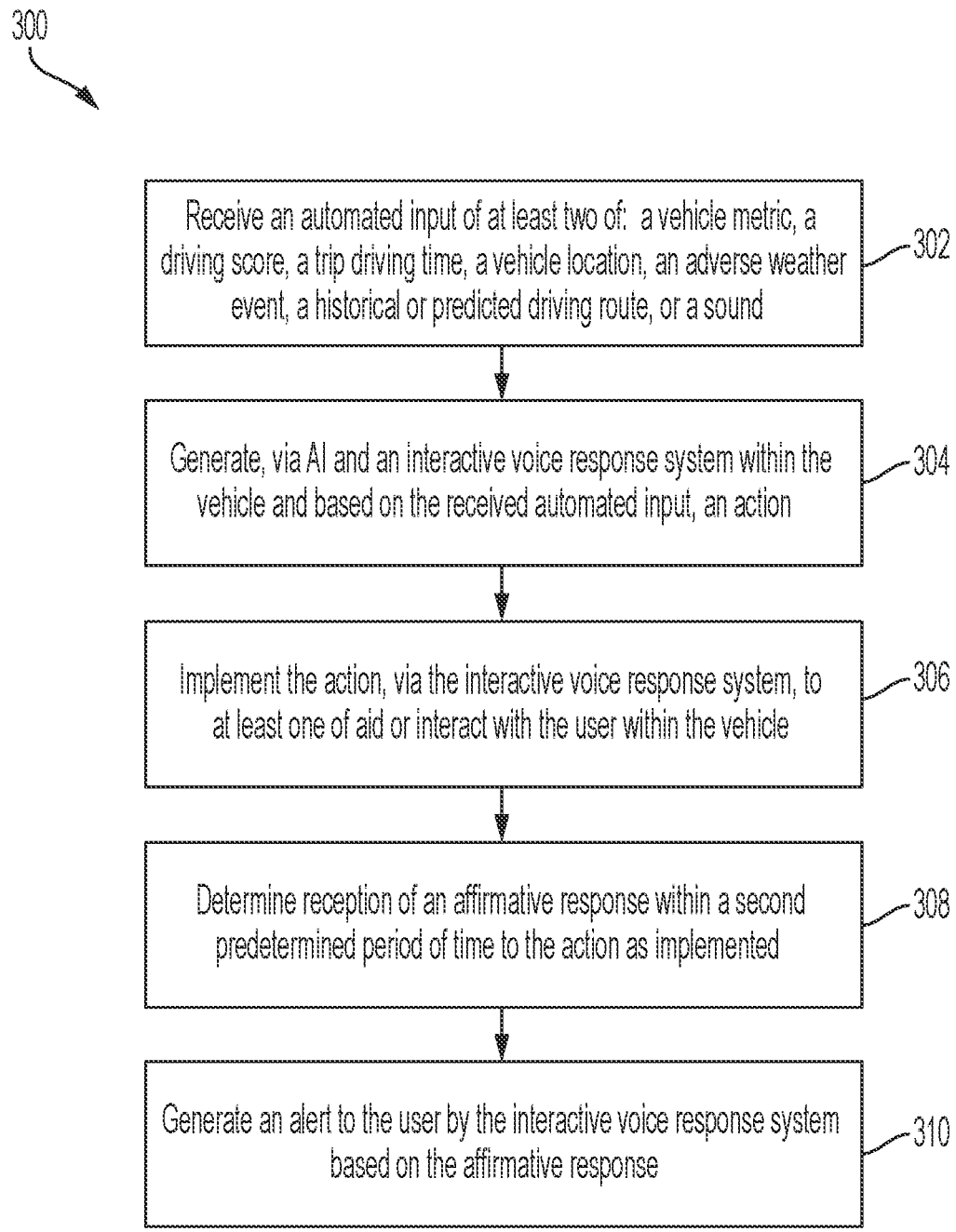
FIG. 3 depicts a flowchart of a process for use with the computing environment and vehicle of FIGS. 1-2, the process directed to receiving an automated input, according to one or more embodiments shown and described herein.

One or more machine readable instructions may be stored on the memory unit 104 that cause the vehicle notification system 100 to perform several functions when executed by the processor 102. For example, referring to FIG. 3, an embodiment of a process 300 is shown for use with the vehicle notification system 100 and interactive voice response system 101 of FIG. 1 and the vehicle 200 of FIG. 2. In block 302, an automated input is received. The automated input may include at least two of the following: a vehicle metric of the vehicle 200, a driving score of the user of the vehicle 200, a driving time during the trip of the vehicle 200, a geographical location of the vehicle 200, an adverse weather event within a predetermined distance of the vehicle 200, a historical driving route of the vehicle 200, a predicted driving route of the vehicle 200 within a first predetermined period of time, or a sound within a predetermined distance of the vehicle 200.

In block 304, an action may be generated via an artificial intelligence component communicatively coupled to the interactive voice response system 101 within the vehicle 200 and based on the received automated input. In block 306, the action may be implemented to at least one of aid or interact with the user within the vehicle 200, via the interactive voice response system 101 within the vehicle 200. In block 308, reception of an affirmative response within a second predetermined period of time to the action as implemented is determined. In block 310, an alert is generated to the user by the interactive voice response system 101 based on the affirmative response.

In embodiments, the one or more machine readable instructions may further cause the vehicle notification system 100 to cause the processor 102 to receive the automated input via the microphone 110 communicatively coupled to the vehicle 200, one or more vehicle sensors of the vehicle 200, a scoring module, a navigation module of the vehicle 200, a weather module communicatively coupled to the vehicle 200, or combinations thereof.

As set forth herein with respect to crash detection, the one or more machine readable instructions may further cause the vehicle notification system 100 to cause the processor 102 to receive the automated input via at least (1) the microphone 110 to receive the sound as a crash sound and (2) the one or more vehicle sensors to receive the vehicle metric as a vehicle operational metric including at least G force as a measure of acceleration of the vehicle 200. The one or more machine readable instructions may further cause the processor 102 to determine, via the artificial intelligence component and based on the received automated input, that the vehicle 200 has been involved in an accident and implement the action of an automatic trigger of an emergency call to an emergency responder, a call to an insurance provider of insurance for the vehicle 200, a diagnosis of a car repair, or combinations thereof.

As further set forth herein with respect to ignition lockout systems, the one or more machine readable instructions may further cause the processor 102 to receive the automated input via at least (1) the one or more vehicle sensors to receive the vehicle metric as a vehicle maintenance level. The vehicle maintenance level may include at least one of a fuel level of the vehicle, an oil level of the vehicle 200, or a tire maintenance status of the vehicle 200. The automated input may also be received by (2) the navigation module of the vehicle 200 to receive the geographical location of the vehicle 200. The one or more machine readable instructions may further cause the processor 102 to determine, via the artificial intelligence component and based on the received automated input, that the vehicle maintenance level is below a threshold and low, implement the action of notifying the user of the vehicle 200 via the interactive voice response system 101 that the vehicle maintenance level is low, determine reception of the affirmative response within the second predetermined period of time from the user that the user desires to increase the vehicle maintenance level, and generate the alert to the user by the interactive voice response system 101 based on the affirmative response as a recommendation to service the vehicle 200 to increase the vehicle maintenance level within a service station located within a recommended distance of the geographical location.

As set forth above with respect to insurance agent call recommendation systems, the one or more machine readable instructions may further cause the vehicle notification system 100 to cause the processor 102 to receive the automated input via at least (1) via the navigation module of the vehicle 200 to receive the predicted driving route of the vehicle 200 and (2) via the navigation module of the vehicle 200 to receive the geographical location of the vehicle 200. The one or more machine readable instructions ay further cause the processor 102 to determine, via the artificial intelligence component and based on the received automated input, that a time associated with the predicted driving route based on the geographical location exceeds a time threshold and implement the action of requesting whether the user of the vehicle 200 via the interactive voice response system 101 would desire to speak with an insurance agent to discuss insurance savings options. The processor 102 may then determine reception of the affirmation response within the second predetermined period of time from the user that the user desires to speak with the insurance agent and generate the alert to the user by the interactive voice response system 101 based on the affirmative response as an automated call to connect the user with the insurance agent.

In accordance with the insurance quotes based on driving systems set forth above, the one or more machine readable instructions may further cause the vehicle notification system 100 to cause the processor 102 to receive the automated input via at least (1) the one or more vehicle sensors to receive the vehicle metric as a vehicle operational metric including current vehicle operational data and (2) the scoring module to further receive the driving score of the user of the vehicle 200 based on the current vehicle operational data. The one or more machine readable instructions may further cause the processor 102 to determine, via the artificial intelligence component and based on the received automated input, that the driving score is lower than a score threshold to be indicative of a safe driving level. When the driving score is lower than the score threshold to be indicative of the safe driving level, the interactive voice response system 101 may implement the action of requesting whether the user of the vehicle 200 via the interactive voice response system 101 would desire to speak with an insurance agent to discuss insurance savings options or be provided within insurance cost savings quotes. The processor 102 may further determine reception of the affirmation response via the microphone 110 and within the second predetermined period of time from the user that the user desires to speak with the insurance agent or be provided with insurance cost savings quotes and generate the alert to the user by the interactive voice response system 101 based on the affirmative response as one of an automated call to connect the user with the insurance agent or insurance costs savings quotes sent directly to the user.

In accordance with the home insurance recommendation systems set forth above, the one or more machine readable instructions may further cause the vehicle notification system 100 to cause the processor 102 to receive the automated input via at least (1) via the navigation module of the vehicle 200 to receive the predicted driving route of the vehicle 200, (2) the navigation module of the vehicle 200 to receive the geographical location of the vehicle 200, and (3) a home-buying application of the user device 114 of the user communicatively coupled to the interactive voice response system 101 to further receive a home-buying schedule of interest for the user. The one or more machine readable instructions may further cause the processor 102 to determine, via the artificial intelligence component and based on the received automated input, a user interest that the user is interested in purchasing a home within a predicted geographical area. Upon the determination of the user interest, the processor 102 may implement the action of requesting whether the user of the vehicle 200 via the interactive voice response system 101 would desire to speak with an insurance agent to discuss home-insurance options. The processor 102 may further determine reception of the affirmation response via the microphone 110 and within the second predetermined period of time from the user that the user desires to speak with the insurance agent and generate the alert to the user by the interactive voice response system 101 based on the affirmative response as an automated call to connect the user with the insurance agent.

In accordance with the safety systems described herein, the one or more machine readable instructions may further cause the vehicle notification system 100 to cause the processor 102 to receive the automated input via at least (1) via the navigation module of the vehicle 200 to receive the geographical location of the vehicle 200 and (2) the weather module to receive information regarding the adverse weather event within the predetermined distance of the vehicle 200. The one or more machine readable instructions may further cause the processor 102 to determine, via the artificial intelligence component and based on the received automated input, a recommendation that the user should take a precaution and implement the action of communicating, via the speaker 122 of the interactive voice response system 101 to the user, the recommendation that the user should take the precaution.

The one or more machine readable instructions may further cause the vehicle notification system 100 to cause the processor 102 to determine reception of the affirmation response via the microphone 110 and within the second predetermined period of time from the user that the user will take the precaution and generate the alert to the user by the interactive voice response system 101 based on the affirmative response as an insurance benefit.

The insurance benefit may include various benefits to the user, such as but not limited to a line of credit, an advancement of money to a user bank account, an insurance premium reduction, an insurance deductible reduction, or an increase in the driving score of the user. Moreover, the adverse weather event may include but is not limited to a flood, hurricane, tornado, wildfire, hail, or combinations thereof. The precaution may include various alerts to the user of the vehicle 200 to protect the user, the user home, and/or the vehicle 200 form damage/harm. For example, the precaution may include evacuate an area surrounding the geographical location of the vehicle 200, reroute from the predicted driving route to avoid or mitigate an impact of the adverse weather event, wait at a location for a wait time indicative of a predicted end time of the adverse weather event, move the vehicle 200 into a garage, board up windows in a home of the user, or buy recommended supplies.

In accordance with the road hazard warning systems as described above, the one or more machine readable instructions may further cause the vehicle notification system 100 to cause the processor 102 to receive the automated input via at least (1) via the navigation module of the vehicle 200 to receive the predicted driving route of the vehicle 200 and (2) the navigation module of the vehicle 200 to receive the geographical location of the vehicle 200. The one or more machine readable instructions may further cause the processor 102 to determine, via the artificial intelligence component and based on the received automated input and based on a risk map database of geographical locations where vehicle insurance claims were filed, that a driving hazard exists in a particular geographical location along the predicted driving route and implement the action of informing the user that the driving hazard exists. The processor 102 may further determine reception of the affirmative response within the second predetermined period of time that the user performed well based on a user driving reaction at the particular geographical location of the driving hazard as tracked by the one or more vehicle sensors and generate the alert to the user by the interactive voice response system 101 based on the affirmative response as a message informing the user that the user performed well based on the user driving reaction.

In accordance with the ignition lockout systems described above, the one or more machine readable instructions may further cause the vehicle notification system 100 to cause the processor 102 to receive the automated input via at least (1) via the navigation module of the vehicle 200 to receive the predicted driving route of the vehicle 200, (2) via the navigation module of the vehicle 200 to receive the geographical location of the vehicle 200, and (3) via the navigation module the driving time during the trip of the vehicle 200. The one or more machine readable instructions may further cause the processor 102 to determine, via the artificial intelligence component and based on the received automated input when the driving time exceeds a threshold, a recommendation that the user takes a break, implement the action of informing the user of the recommendation, and determine reception of the affirmative response within the second predetermined period of time that the user has stopped the vehicle 200. The processor 102 may further implement an ignition lock-out of the vehicle 200 and generate the alert to the user by the interactive voice response system 101 based on the affirmative response as a message informing the user that an ignition lock-out is implemented for one of a lock-out period of time or until a different driver other than the user is detected via the one or more vehicle sensors.

In accordance with the systems integrating a home-control unit described herein, the one or more machine readable instructions may further cause the vehicle notification system 100 to cause the processor 102 to receive the automated input via at least (1) via the navigation module of the vehicle 200 to receive the predicted driving route of the vehicle 200, (2) the navigation module of the vehicle 200 to receive the geographical location of the vehicle 200, and (3) a home-control unit of a home of the user communicatively coupled to the processor 102 to alert the user of one or more home events occurring when the user is away from the home. The one or more machine readable instructions may further cause the processor 102 to determine, via the artificial intelligence component and based on the received automated input, as a remote from home vehicle location that the vehicle 200 is remote from the home of the user such that the user is away from the home. Upon the determination of the remote from home vehicle location, the processor 102 may implement the action of, via the interactive voice response system 101, a recommendation regarding the one or more home events. The processor 102 may further determine reception of the affirmation response via the microphone 110 and within the second predetermined period of time from the user to accept the recommendation and generate the alert to the user by the interactive voice response system 101 based on the affirmative response that the recommendation has been implemented at the home of the user.

The one or more home events may include any event the user may be concerned of while away from home. In embodiments, the one or more home events may include at least one of a water leak, a gas leak, a broken window, an unlocked door, an open door, an open garage door, a package delivery, an off heater pilot light, or an off home alone mode. Further, the recommendation may include an action to repair the one or more home events. In embodiments, the recommendation may include at least one of turn off a valve associated with a detected leak as the one or more home event, turn on the home alone mode, the home alone mode configured to turn lights on and off at the home at prescheduled time intervals, shut off gas to a heater, lock an unlocked door, or close the open garage door.

In accordance with the road-side assistance unit described herein, the one or more machine readable instructions may further cause the vehicle notification system 100 to cause the processor 102 to receive the automated input via at least (1) the one or more vehicle sensors to receive the vehicle metric as a vehicle operational metric and (2) the navigation module of the vehicle 200 to receive the geographical location of the vehicle 200. The one or more machine readable instructions may further cause the processor 102 to determine, via the artificial intelligence component and based on the received automated input, that the vehicle 200 requires road-side assistance at the geographical location. The processor 102 may further implement the action of an automatic trigger of a call to a responder, a satellite call to the responder when the geographical location is in an off-grid location remote from a cellular tower, a call to an insurance provider of insurance for the vehicle 200, a diagnosis of a type of road-side assistance required, a call to police authorities regarding a dangerous driver tagged with the geographical location of the user, or combinations thereof. Based on the affirmative response of the action as implemented, the processor 102 may generate the alert to the user by the interactive voice response system 101 that road-side assistance has been dispatched along with at least one of communication information or tracking information associated with the road-side assistance. The roadside assistance may include a delivery service to deliver a vehicle part to the user. In embodiments, the roadside assistance includes a drone delivery service.

In accordance with the police interaction systems described above, the one or more machine readable instructions may further cause the vehicle notification system 100 to cause the processor 102 to receive the automated input via at least (1) the one or more vehicle sensors to receive the vehicle metric as a vehicle operational metric and (2) the navigation module of the vehicle 200 to receive the geographical location of the vehicle 200. The one or more machine readable instructions may further cause the processor 102 to determine, via the artificial intelligence component and based on the received automated input, that the vehicle 200 is stopped and is being approached by police. Based on the determination that the vehicle 200 is being approached by police, the processor 102 may implement the action, via the interactive voice response system 101, of providing an audio recommendation of how to interact with the police during an interaction. Based on the affirmative response of the action as implemented, the processor 102 may generate the alert to the user by the interactive voice response system 101 that the interaction is being recorded. In embodiments, the one or more machine readable instructions may further cause the processor 102 to record the interaction via a driver recording system configured to record audio and video of the user and inside and outside of the vehicle 200 through at least one of the one or more vehicle sensors, the microphone 110, and a plurality of cameras communicatively coupled to the vehicle 200.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

Aspects Listing:

Aspect 1. A vehicle notification system, the system including: at least one processor communicatively coupled to a network, an interactive voice response system within a vehicle, a memory communicatively coupled to the at least one processor and the interactive voice response system, and one or more machine readable instructions stored in the memory that cause the vehicle notification system to perform at least the following when executed by the at least one processor: receive an automated input including at least two of the following: a vehicle metric of the vehicle, a driving score of a user of the vehicle, a driving time during a trip of the vehicle, a geographical location of the vehicle, an adverse weather event within a predetermined distance of the vehicle, a historical driving route of the vehicle, a predicted driving route of the vehicle within a first predetermined period of time, or a sound within a predetermined distance of the vehicle, generate, via an artificial intelligence component communicatively coupled to the interactive voice response system within the vehicle and based on the received automated input, an action, implement the action, via the interactive voice response system within the vehicle, to at least one of aid or interact with the user within the vehicle, determine reception of an affirmative response within a second predetermined period of time to the action as implemented, and generate an alert to the user by the interactive voice response system based on the affirmative response.

Aspect 2. The vehicle notification system of Aspect 1, wherein the one or more machine readable instructions further cause the vehicle notification system to perform at least the following when executed by the at least one processor: receive the automated input via a microphone communicatively coupled to the vehicle, one or more vehicle sensors of the vehicle, a scoring module, a navigation module of the vehicle, a weather module communicatively coupled to the vehicle, or combinations thereof.

Aspect 3. The vehicle notification system of Aspect 2, wherein the one or more machine readable instructions further cause the vehicle notification system to perform at least the following when executed by the at least one processor: receive the automated input via at least (1) the microphone to receive the sound as a crash sound, and (2) the one or more vehicle sensors to receive the vehicle metric as a vehicle operational metric including at least G force as a measure of acceleration of the vehicle, determine, via the artificial intelligence component and based on the received automated input, that the vehicle has been involved in an accident, and implement the action of an automatic trigger of an emergency call to an emergency responder, a call to an insurance provider of insurance for the vehicle, a diagnosis of a car repair, or combinations thereof.

Aspect 4. The vehicle notification system of either of Aspect 2 or Aspect 3, wherein the one or more machine readable instructions further cause the vehicle notification system to perform at least the following when executed by the at least one processor: receive the automated input via at least (1) the one or more vehicle sensors to receive the vehicle metric as a vehicle maintenance level, wherein the vehicle maintenance level includes at least one of a fuel level of the vehicle, an oil level of the vehicle, or a tire maintenance status of the vehicle, and (2) the navigation module of the vehicle to receive the geographical location of the vehicle, determine, via the artificial intelligence component and based on the received automated input, that the vehicle maintenance level is below a threshold and low, implement the action of notifying the user of the vehicle via the interactive voice response system that the vehicle maintenance level is low, determine reception of the affirmative response within the second predetermined period of time from the user that the user desires to increase the vehicle maintenance level, and generate the alert to the user by the interactive voice response system based on the affirmative response as a recommendation to service the vehicle to increase the vehicle maintenance level within a service station located within a recommended distance of the geographical location.

Aspect 5. The vehicle notification system of any of Aspect 2 to Aspect 4, wherein the one or more machine readable instructions further cause the vehicle notification system to perform at least the following when executed by the at least one processor: receive the automated input via at least (1) via the navigation module of the vehicle to receive the predicted driving route of the vehicle, and (2) via the navigation module of the vehicle to receive the geographical location of the vehicle, determine, via the artificial intelligence component and based on the received automated input, that a time associated with the predicted driving route based on the geographical location exceeds a time threshold, implement the action of requesting whether the user of the vehicle via the interactive voice response system would desire to speak with an insurance agent to discuss insurance savings options, determine reception of the affirmation response within the second predetermined period of time from the user that the user desires to speak with the insurance agent, and generate the alert to the user by the interactive voice response system based on the affirmative response as an automated call to connect the user with the insurance agent.

Aspect 6. The vehicle notification system of any of Aspect 2 to Aspect 5, wherein the one or more machine readable instructions further cause the vehicle notification system to perform at least the following when executed by the at least one processor: receive the automated input via at least (1) the one or more vehicle sensors to receive the vehicle metric as a vehicle operational metric including current vehicle operational data, and (2) the scoring module to further receive the driving score of the user of the vehicle based on the current vehicle operational data, determine, via the artificial intelligence component and based on the received automated input, that the driving score is lower than a score threshold to be indicative of a safe driving level, when the driving score is lower than the score threshold to be indicative of the safe driving level, implement the action of requesting whether the user of the vehicle via the interactive voice response system would desire to speak with an insurance agent to discuss insurance savings options or be provided within insurance cost savings quotes, determine reception of the affirmation response via the microphone and within the second predetermined period of time from the user that the user desires to speak with the insurance agent or be provided with insurance cost savings quotes, and generate the alert to the user by the interactive voice response system based on the affirmative response as one of an automated call to connect the user with the insurance agent or insurance costs savings quotes sent directly to the user.

Aspect 7. The vehicle notification system of any of Aspect 2 to Aspect 6, wherein the one or more machine readable instructions further cause the vehicle notification system to perform at least the following when executed by the at least one processor: receive the automated input via at least (1) via the navigation module of the vehicle to receive the predicted driving route of the vehicle, (2) the navigation module of the vehicle to receive the geographical location of the vehicle, and (3) a home-buying application of a user device of the user communicatively coupled to the interactive voice response system to further receive a home-buying schedule of interest for the user, determine, via the artificial intelligence component and based on the received automated input, as a user interest that the user is interested in purchasing a home within a predicted geographical area, upon the determination of the user interest, implement the action of requesting whether the user of the vehicle via the interactive voice response system would desire to speak with an insurance agent to discuss home-insurance options, determine reception of the affirmation response via the microphone and within the second predetermined period of time from the user that the user desires to speak with the insurance agent, and generate the alert to the user by the interactive voice response system based on the affirmative response as an automated call to connect the user with the insurance agent.

Aspect 8. The vehicle notification system of any of Aspect 2 to Aspect 7, wherein the one or more machine readable instructions further cause the vehicle notification system to perform at least the following when executed by the at least one processor: receive the automated input via at least (1) via the navigation module of the vehicle to receive the geographical location of the vehicle, and (2) the weather module to receive information regarding the adverse weather event within the predetermined distance of the vehicle, determine, via the artificial intelligence component and based on the received automated input, a recommendation that the user should take a precaution, and implement the action of communicating, via a speaker of the interactive voice response system to the user, the recommendation that the user should take the precaution.

Aspect 9. The vehicle notification system of Aspect 8, wherein the one or more machine readable instructions further cause the vehicle notification system to perform at least the following when executed by the at least one processor: determine reception of the affirmation response via the microphone and within the second predetermined period of time from the user that the user will take the precaution, and generate the alert to the user by the interactive voice response system based on the affirmative response as an insurance benefit.

Aspect 10. The vehicle notification system of Aspect 9, wherein the insurance benefit includes at least one of: a line of credit, an advancement of money to a user bank account, an insurance premium reduction, an insurance deductible reduction, or an increase in the driving score of the user, and wherein the adverse weather event includes one of a flood, hurricane, tornado, wildfire, hail, or combinations thereof.

Aspect 11. The vehicle notification system of either of Aspect 9 or Aspect 10, wherein the precaution includes at least one of the following: evacuate an area surrounding the geographical location of the vehicle, reroute from the predicted driving route to avoid or mitigate an impact of the adverse weather event, wait at a location for a wait time indicative of a predicted end time of the adverse weather event, move the vehicle into a garage, board up windows in a home of the user, or buy recommended supplies.

Aspect 12. The vehicle notification system of any of Aspect 2 to Aspect 11, wherein the one or more machine readable instructions further cause the vehicle notification system to perform at least the following when executed by the at least one processor: receive the automated input via at least (1) via the navigation module of the vehicle to receive the predicted driving route of the vehicle, and (2) the navigation module of the vehicle to receive the geographical location of the vehicle, determine, via the artificial intelligence component and based on the received automated input and based on a risk map database of geographical locations where vehicle insurance claims were filed, that a driving hazard exists in a particular geographical location along the predicted driving route, implement the action of informing the user that the driving hazard exists, determine reception of the affirmative response within the second predetermined period of time that the user performed well based on a user driving reaction at the particular geographical location of the driving hazard as tracked by the one or more vehicle sensors, and generate the alert to the user by the interactive voice response system based on the affirmative response as a message informing the user that the user performed well based on the user driving reaction.

Aspect 13. The vehicle notification system of any of Aspect 2 to Aspect 12, wherein the one or more machine readable instructions further cause the vehicle notification system to perform at least the following when executed by the at least one processor: receive the automated input via at least (1) via the navigation module of the vehicle to receive the predicted driving route of the vehicle, (2) via the navigation module of the vehicle to receive the geographical location of the vehicle, and (3) via the navigation module the driving time during the trip of the vehicle, determine, via the artificial intelligence component and based on the received automated input when the driving time exceeds a threshold, that a recommendation that the user takes a break, implement the action of informing the user of the recommendation, determine reception of the affirmative response within the second predetermined period of time that the user has stopped the vehicle, implement an ignition lock-out of the vehicle, and generate the alert to the user by the interactive voice response system based on the affirmative response as a message informing the user that an ignition lock-out is implemented for one of a lock-out period of time or until a different driver other than the user is detected via the one or more vehicle sensors.

Aspect 14. The vehicle notification system of any of Aspect 2 to Aspect 13, wherein the one or more machine readable instructions further cause the vehicle notification system to perform at least the following when executed by the at least one processor, receive the automated input via at least (1) via the navigation module of the vehicle to receive the predicted driving route of the vehicle, (2) the navigation module of the vehicle to receive the geographical location of the vehicle, and (3) a home-control unit of a home of the user communicatively coupled to the processor to alert the user of one or more home events occurring when the user is away from the home, determine, via the artificial intelligence component and based on the received automated input, as a remote from home vehicle location that the vehicle is remote from the home of the user such that the user is away from the home, upon the determination of the remote from home vehicle location, implement the action of, via the interactive voice response system, a recommendation regarding the one or more home events, determine reception of the affirmation response via the microphone and within the second predetermined period of time from the user to accept the recommendation, and generate the alert to the user by the interactive voice response system based on the affirmative response that the recommendation has been implemented at the home of the user.

Aspect 15. The vehicle notification system of Aspect 14, wherein the one or more home events includes at least one of the following: a water leak, a gas leak, a broken window, an unlocked door, an open door, an open garage door, a package delivery, an off heater pilot light, or an off home alone mode.

Aspect 16. The vehicle notification system of Aspect 15, wherein the recommendation includes at least one of the following: turn off a valve associated with a detected leak as the one or more home event, turn on the home alone mode, the home along alone mode configured to turn lights on and off at the home at prescheduled time intervals, shut off gas to a heater, lock an unlocked door, or close the open garage door.

Aspect 17. The vehicle notification system of any of Aspect 2 to Aspect 16, wherein the one or more machine readable instructions further cause the vehicle notification system to perform at least the following when executed by the at least one processor: receive the automated input via at least (1) the one or more vehicle sensors to receive the vehicle metric as a vehicle operational metric, and (2) the navigation module of the vehicle to receive the geographical location of the vehicle, determine, via the artificial intelligence component and based on the received automated input, that the vehicle requires road-side assistance at the geographical location, implement the action of an automatic trigger of a call to a responder, a satellite call to the responder when the geographical location is in an off-grid location remote from a cellular tower, a call to an insurance provider of insurance for the vehicle, a diagnosis of a type of road-side assistance required, a call to police authorities regarding a dangerous driver tagged with the geographical location of the user, or combinations thereof, and based on the affirmative response of the action as implemented, generate the alert to the user by the interactive voice response system that road-side assistance has been dispatched along with at least one of communication information or tracking information associated with the road-side assistance.

Aspect 18. The vehicle notification system of Aspect 17, wherein the roadside assistance includes a drone delivery service to deliver a vehicle part to the user.

Aspect 19. The vehicle notification system of any of Aspect 2 to Aspect 18, wherein the one or more machine readable instructions further cause the vehicle notification system to perform at least the following when executed by the at least one processor: receive the automated input via at least (1) the one or more vehicle sensors to receive the vehicle metric as a vehicle operational metric, and (2) the navigation module of the vehicle to receive the geographical location of the vehicle, determine, via the artificial intelligence component and based on the received automated input, that the vehicle is stopped and is being approached by police, based on the determination that the vehicle is being approached by police, implement the action, via the interactive voice response system, of providing an audio recommendation of how to interact with the police during an interaction, and based on the affirmative response of the action as implemented, generate the alert to the user by the interactive voice response system that the interaction is being recorded.

Aspect 20. The vehicle notification system of Aspect 19, wherein the one or more machine readable instructions further cause the vehicle notification system to perform at least the following when executed by the at least one processor: record the interaction via a driver recording system configured to record audio and video of the user and inside and outside of the vehicle through at least one of the one or more vehicle sensors, the microphone, and a plurality of cameras communicatively coupled to the vehicle.

What is claimed is:
1. A vehicle notification system, the system comprising:
at least one processor communicatively coupled to a network;
an interactive voice response system within a vehicle;
a memory communicatively coupled to the at least one processor and the interactive voice response system; and
one or more machine readable instructions stored in the memory that cause the vehicle notification system to perform at least the following when executed by the at least one processor:
receive an automated input comprising at least two of the following: a vehicle metric of the vehicle, a driving score of a user of the vehicle, a driving time during a trip of the vehicle, a geographical location of the vehicle, an adverse weather event within a predetermined distance of the vehicle, a historical driving route of the vehicle, a predicted driving route of the vehicle within a first predetermined period of time, or a sound within a predetermined distance of the vehicle;

generate, via an artificial intelligence component communicatively coupled to the interactive voice response system within the vehicle and based on the received automated input, an action;

implement the action, via the interactive voice response system within the vehicle, to at least one of aid or interact with the user within the vehicle;

determine reception of an affirmative response within a second predetermined period of time to the action as implemented; and generate an alert to the user by the interactive voice response system based on the affirmative response.

2. The vehicle notification system of claim 1, wherein the one or more machine readable instructions further cause the vehicle notification system to perform at least the following when executed by the at least one processor:

receive the automated input via a microphone communicatively coupled to the vehicle, one or more vehicle sensors of the vehicle, a scoring module, a navigation module of the vehicle, a weather module communicatively coupled to the vehicle, or combinations thereof.

3. The vehicle notification system of claim 2, wherein the one or more machine readable instructions further cause the vehicle notification system to perform at least the following when executed by the at least one processor:

receive the automated input via at least (1) the microphone to receive the sound as a crash sound, and (2) the one or more vehicle sensors to receive the vehicle metric as a vehicle operational metric comprising at least G force as a measure of acceleration of the vehicle;

determine, via the artificial intelligence component and based on the received automated input, that the vehicle has been involved in an accident; and implement the action of an automatic trigger of an emergency call to an emergency responder, a call to an insurance provider of insurance for the vehicle, a diagnosis of a car repair, or combinations thereof.

4. The vehicle notification system of claim 2, wherein the one or more machine readable instructions further cause the vehicle notification system to perform at least the following when executed by the at least one processor:

receive the automated input via at least (1) the one or more vehicle sensors to receive the vehicle metric as a vehicle maintenance level, wherein the vehicle maintenance level comprises at least one of a fuel level of the vehicle, an oil level of the vehicle, or a tire maintenance status of the vehicle, and (2) the navigation module of the vehicle to receive the geographical location of the vehicle;

determine, via the artificial intelligence component and based on the received automated input, that the vehicle maintenance level is below a threshold and low;

implement the action of notifying the user of the vehicle via the interactive voice response system that the vehicle maintenance level is low;

determine reception of the affirmative response within the second predetermined period of time from the user that the user desires to increase the vehicle maintenance level; and generate the alert to the user by the interactive voice response system based on the affirmative response as a recommendation to service the vehicle to increase the vehicle maintenance level within a service station located within a recommended distance of the geographical location.

5. The vehicle notification system of claim 2, wherein the one or more machine readable instructions further cause the vehicle notification system to perform at least the following when executed by the at least one processor:

receive the automated input via at least (1) via the navigation module of the vehicle to receive the predicted driving route of the vehicle, and (2) via the navigation module of the vehicle to receive the geographical location of the vehicle;

determine, via the artificial intelligence component and based on the received automated input, that a time associated with the predicted driving route based on the geographical location exceeds a time threshold;

implement the action of requesting whether the user of the vehicle via the interactive voice response system would desire to speak with an insurance agent to discuss insurance savings options;

determine reception of the affirmation response within the second predetermined period of time from the user that the user desires to speak with the insurance agent; and generate the alert to the user by the interactive voice response system based on the affirmative response as an automated call to connect the user with the insurance agent.

6. The vehicle notification system of claim 2, wherein the one or more machine readable instructions further cause the vehicle notification system to perform at least the following when executed by the at least one processor:

receive the automated input via at least (1) the one or more vehicle sensors to receive the vehicle metric as a vehicle operational metric comprising current vehicle operational data, and (2) the scoring module to further receive the driving score of the user of the vehicle based on the current vehicle operational data;

determine, via the artificial intelligence component and based on the received automated input, that the driving score is lower than a score threshold to be indicative of a safe driving level;

when the driving score is lower than the score threshold to be indicative of the safe driving level, implement the action of requesting whether the user of the vehicle via the interactive voice response system would desire to speak with an insurance agent to discuss insurance savings options or be provided within insurance cost savings quotes;

determine reception of the affirmation response via the microphone and within the second predetermined period of time from the user that the user desires to speak with the insurance agent or be provided with insurance cost savings quotes; and generate the alert to the user by the interactive voice response system based on the affirmative response as one of an automated call to connect the user with the insurance agent or insurance costs savings quotes sent directly to the user.

7. The vehicle notification system of claim 2, wherein the one or more machine readable instructions further cause the vehicle notification system to perform at least the following when executed by the at least one processor:

receive the automated input via at least (1) via the navigation module of the vehicle to receive the predicted driving route of the vehicle, (2) the navigation module of the vehicle to receive the geographical location of the vehicle, and (3) a home-buying application of a user device of the user communicatively coupled to the interactive voice response system to further receive a home-buying schedule of interest for the user;

determine, via the artificial intelligence component and based on the received automated input, a user interest that the user is interested in purchasing a home within a predicted geographical area;

upon the determination of the user interest, implement the action of requesting whether the user of the vehicle via the interactive voice response system would desire to speak with an insurance agent to discuss home-insurance options;

determine reception of the affirmation response via the microphone and within the second predetermined period of time from the user that the user desires to speak with the insurance agent; and generate the alert to the user by the interactive voice response system based on the affirmative response as an automated call to connect the user with the insurance agent.

8. The vehicle notification system of claim 2, wherein the one or more machine readable instructions further cause the vehicle notification system to perform at least the following when executed by the at least one processor:

receive the automated input via at least (1) via the navigation module of the vehicle to receive the geographical location of the vehicle, and (2) the weather module to receive information regarding the adverse weather event within the predetermined distance of the vehicle;

determine, via the artificial intelligence component and based on the received automated input, a recommendation that the user should take a precaution; and implement the action of communicating, via a speaker of the interactive voice response system to the user, the recommendation that the user should take the precaution.

9. The vehicle notification system of claim 8, wherein the one or more machine readable instructions further cause the vehicle notification system to perform at least the following when executed by the at least one processor:

determine reception of the affirmation response via the microphone and within the second predetermined period of time from the user that the user will take the precaution; and generate the alert to the user by the interactive voice response system based on the affirmative response as an insurance benefit.

10. The vehicle notification system of claim 9, wherein the insurance benefit comprises at least one of:

a line of credit, an advancement of money to a user bank account, an insurance premium reduction, an insurance deductible reduction, or an increase in the driving score of the user, and wherein the adverse weather event comprises one of a flood, hurricane, tornado, wildfire, hail, or combinations thereof.

11. The vehicle notification system of claim 9, wherein the precaution comprises at least one of the following:

evacuate an area surrounding the geographical location of the vehicle, reroute from the predicted driving route to avoid or mitigate an impact of the adverse weather event, wait at a location for a wait time indicative of a predicted end time of the adverse weather event, move the vehicle into a garage, board up windows in a home of the user, or buy recommended supplies.

12. The vehicle notification system of claim 2, wherein the one or more machine readable instructions further cause the vehicle notification system to perform at least the following when executed by the at least one processor:

receive the automated input via at least (1) via the navigation module of the vehicle to receive the predicted driving route of the vehicle, and (2) the navigation module of the vehicle to receive the geographical location of the vehicle;

determine, via the artificial intelligence component and based on the received automated input and based on a risk map database of geographical locations where vehicle insurance claims were filed, that a driving hazard exists in a particular geographical location along the predicted driving route;

implement the action of informing the user that the driving hazard exists;

determine reception of the affirmative response within the second predetermined period of time that the user performed well based on a user driving reaction at the particular geographical location of the driving hazard as tracked by the one or more vehicle sensors; and generate the alert to the user by the interactive voice response system based on the affirmative response as a message informing the user that the user performed well based on the user driving reaction.

13. The vehicle notification system of claim 2, wherein the one or more machine readable instructions further cause the vehicle notification system to perform at least the following when executed by the at least one processor:

receive the automated input via at least (1) via the navigation module of the vehicle to receive the predicted driving route of the vehicle, (2) via the navigation module of the vehicle to receive the geographical location of the vehicle, and (3) via the navigation module the driving time during the trip of the vehicle;

determine, via the artificial intelligence component and based on the received automated input when the driving time exceeds a threshold, a recommendation that the user takes a break;

implement the action of informing the user of the recommendation;

determine reception of the affirmative response within the second predetermined period of time that the user has stopped the vehicle;

implement an ignition lock-out of the vehicle; and generate the alert to the user by the interactive voice response system based on the affirmative response as a message informing the user that an ignition lock-out is implemented for one of a lock-out period of time or until a different driver other than the user is detected via the one or more vehicle sensors.

14. The vehicle notification system of claim 2, wherein the one or more machine readable instructions further cause the vehicle notification system to perform at least the following when executed by the at least one processor:

receive the automated input via at least (1) via the navigation module of the vehicle to receive the predicted driving route of the vehicle, (2) the navigation module of the vehicle to receive the geographical location of the vehicle, and (3) a home-control unit of a home of the user communicatively coupled to the processor to alert the user of one or more home events occurring when the user is away from the home;

determine, via the artificial intelligence component and based on the received automated input, as a remote from home vehicle location that the vehicle is remote from the home of the user such that the user is away from the home;

upon the determination of the remote from home vehicle location, implement the action of, via the interactive voice response system, a recommendation regarding the one or more home events;

determine reception of the affirmation response via the microphone and within the second predetermined period of time from the user to accept the recommendation; and generate the alert to the user by the interactive voice response system based on the affirmative response that the recommendation has been implemented at the home of the user.

15. The vehicle notification system of claim 14, wherein the one or more home events comprises at least one of the following: a water leak, a gas leak, a broken window, an unlocked door, an open door, an open garage door, a package delivery, an off heater pilot light, or an off home alone mode.

16. The vehicle notification system of claim 15, wherein the recommendation comprises at least one of the following:
turn off a valve associated with a detected leak as the one or more home event;
turn on the home alone mode, the home alone mode configured to turn lights on and off at the home at prescheduled time intervals;
shut off gas to a heater;
lock an unlocked door; or
close the open garage door.

17. The vehicle notification system of claim 2, wherein the one or more machine readable instructions further cause the vehicle notification system to perform at least the following when executed by the at least one processor:

receive the automated input via at least (1) the one or more vehicle sensors to receive the vehicle metric as a vehicle operational metric, and (2) the navigation module of the vehicle to receive the geographical location of the vehicle;

determine, via the artificial intelligence component and based on the received automated input, that the vehicle requires road-side assistance at the geographical location;

implement the action of an automatic trigger of a call to a responder, a satellite call to the responder when the geographical location is in an off-grid location remote from a cellular tower, a call to an insurance provider of insurance for the vehicle, a diagnosis of a type of road-side assistance required, a call to police authorities regarding a dangerous driver tagged with the geographical location of the user, or combinations thereof; and based on the affirmative response of the action as implemented, generate the alert to the user by the interactive voice response system that road-side assistance has been dispatched along with at least one of communication information or tracking information associated with the road-side assistance.

18. The vehicle notification system of claim 17, wherein the roadside assistance comprises a drone delivery service to deliver a vehicle part to the user.

19. The vehicle notification system of claim 2, wherein the one or more machine readable instructions further cause the vehicle notification system to perform at least the following when executed by the at least one processor:

receive the automated input via at least (1) the one or more vehicle sensors to receive the vehicle metric as a vehicle operational metric, and (2) the navigation module of the vehicle to receive the geographical location of the vehicle;

determine, via the artificial intelligence component and based on the received automated input, that the vehicle is stopped and is being approached by police;

based on the determination that the vehicle is being approached by police, implement the action, via the interactive voice response system, of providing an audio recommendation of how to interact with the police during an interaction; and based on the affirmative response of the action as implemented, generate the alert to the user by the interactive voice response system that the interaction is being recorded.

20. The vehicle notification system of claim 19, wherein the one or more machine readable instructions further cause the vehicle notification system to perform at least the following when executed by the at least one processor:

record the interaction via a driver recording system configured to record audio and video of the user and inside and outside of the vehicle through at least one of the one or more vehicle sensors, the microphone, and a plurality of cameras communicatively coupled to the vehicle.

* * * * *